United States Patent
Bechtold et al.

(10) Patent No.: US 10,477,843 B2
(45) Date of Patent: Nov. 19, 2019

(54) FISHING HOOK WITH TIE RAIL

(71) Applicants: Corey Bechtold, Big Lake, MN (US); Lisa Bechtold, Big Lake, MN (US)

(72) Inventors: Corey Bechtold, Big Lake, MN (US); Lisa Bechtold, Big Lake, MN (US)

(73) Assignee: Clam Corporation, Rogers, MN (US)

( * ) Notice: Subject to any disclaimer, the term of this patent is extended or adjusted under 35 U.S.C. 154(b) by 8 days.

(21) Appl. No.: 15/225,354

(22) Filed: Aug. 1, 2016

(65) Prior Publication Data

US 2017/0172124 A1    Jun. 22, 2017

Related U.S. Application Data

(63) Continuation of application No. 13/800,438, filed on Mar. 13, 2013, now Pat. No. 9,402,379.

(60) Provisional application No. 61/696,863, filed on Sep. 5, 2012.

(51) Int. Cl.
| | | |
|---|---|---|
| *A01K 85/00* | (2006.01) | |
| *A01K 83/00* | (2006.01) | |
| *B21F 45/12* | (2006.01) | |
| *A01K 95/02* | (2006.01) | |

(52) U.S. Cl.
CPC .............. *A01K 85/00* (2013.01); *A01K 83/00* (2013.01); *A01K 95/02* (2013.01); *B21F 45/12* (2013.01)

(58) Field of Classification Search
CPC .................................................. A01K 85/00
USPC ........... 43/42.39, 44.81, 42.24, 42.49, 42.22, 43/42.23, 42.08
See application file for complete search history.

(56) References Cited

U.S. PATENT DOCUMENTS

| | | | | |
|---|---|---|---|---|
| 1,499,819 A | * | 7/1924 | Goble .................... | A01K 85/18 43/42.15 |
| 1,727,936 A | * | 9/1929 | Pflueger ................. | A01K 85/16 43/42.08 |
| 1,898,200 A | * | 2/1933 | Medlin .................. | A01K 85/16 43/42.23 |
| 2,161,094 A | * | 6/1939 | Saunders, Jr. ......... | A01K 85/16 428/16 |
| 2,295,292 A | * | 9/1942 | Rogers .................. | A01K 85/16 43/42.09 |
| 2,557,516 A | * | 6/1951 | Schipper ................ | A01K 85/16 43/42.22 |
| 2,589,007 A | * | 3/1952 | Landon .................. | A01K 85/00 43/42.28 |
| 2,618,094 A | * | 11/1952 | Shindler ................ | A01K 85/08 43/42.24 |
| 2,847,791 A | * | 8/1958 | Simmons ............... | A01K 85/16 43/42.26 |

(Continued)

FOREIGN PATENT DOCUMENTS

| | | | |
|---|---|---|---|
| DE | 19640144 | 4/1998 | |
| DE | 19640144 A1 * | 4/1998 | ............. A01K 85/00 |

(Continued)

OTHER PUBLICATIONS

Chicken Leg Jig, Printed from "http://www.bayoutackle.com/chicken_leg_jig.html", Aug. 28, 2014, 3 pages.

*Primary Examiner* — Darren W Ark

(74) *Attorney, Agent, or Firm* — Cook Alex Ltd.

(57) ABSTRACT

A fishing hook assembly includes a hook element including a tie rail, which defines an enlarged line-pass-through area.

11 Claims, 12 Drawing Sheets

(56) References Cited

U.S. PATENT DOCUMENTS

| | | | | |
|---|---|---|---|---|
| 2,989,817 A * | 6/1961 | Kepler | A01K 83/00 | 43/42.39 |
| 3,091,883 A * | 6/1963 | Hufford | A01K 85/16 | 43/42.08 |
| 3,091,885 A * | 6/1963 | Ulsh | A01K 85/00 | 43/42.52 |
| 3,133,372 A * | 5/1964 | Born | A01K 85/16 | 43/42.34 |
| 3,344,548 A * | 10/1967 | Kurlovich | A01K 85/16 | 43/42.08 |
| 3,344,549 A * | 10/1967 | Peters | A01K 85/00 | 43/42.11 |
| 3,393,465 A * | 7/1968 | Powell | A01K 85/16 | 43/17.6 |
| 3,410,020 A * | 11/1968 | McClellan | A01K 85/00 | 43/42.34 |
| 3,611,614 A * | 10/1971 | Ward | A01K 85/00 | 43/42.24 |
| 3,688,434 A * | 9/1972 | Le Vau | A01K 85/00 | 43/42.23 |
| 3,750,321 A * | 8/1973 | McClellan | A01K 85/00 | 43/42.1 |
| 3,909,974 A * | 10/1975 | Kent | A01K 85/00 | 43/42.31 |
| 3,956,847 A * | 5/1976 | Bayes | A01K 95/00 | 43/43.1 |
| 4,044,491 A * | 8/1977 | Potter | A01K 85/00 | 43/42.22 |
| 4,129,957 A * | 12/1978 | Thirlby | A01K 83/06 | 43/42.49 |
| 4,280,296 A * | 7/1981 | Volenec | A01K 83/00 | 43/44.81 |
| D279,713 S * | 7/1985 | Gregory | D11/158 | |
| 4,535,562 A * | 8/1985 | Fry | A01K 91/04 | 43/42.49 |
| 4,712,326 A * | 12/1987 | Hoover | A01K 85/01 | 43/42.31 |
| 4,713,907 A * | 12/1987 | Dudeck | A01K 85/00 | 43/42.39 |
| 4,819,366 A * | 4/1989 | Manno | A01K 85/00 | 43/42.39 |
| D324,407 S * | 3/1992 | Snyder | D22/126 | |
| 5,231,786 A * | 8/1993 | Hughes | A01K 85/00 | 43/42.39 |
| 5,373,658 A * | 12/1994 | Huppert | A01K 85/00 | 43/42.37 |
| 5,491,927 A * | 2/1996 | Ortiz | A01K 85/00 | 43/42.28 |
| 5,537,775 A * | 7/1996 | Crumrine | A01K 85/00 | 43/42.38 |
| 5,598,659 A * | 2/1997 | Vanorden | A01K 85/16 | 43/42.23 |
| 5,899,015 A * | 5/1999 | Link | A01K 85/00 | 43/42.28 |
| 5,953,849 A * | 9/1999 | Boucher, Jr. | A01K 85/00 | 43/42.08 |
| 5,970,650 A * | 10/1999 | Mammel | A01K 83/00 | 43/43.16 |
| 6,772,553 B2 * | 8/2004 | Phillips | A01K 85/02 | 43/42.11 |
| 6,898,894 B1 * | 5/2005 | Anderson | A01K 85/00 | 43/42.39 |
| 7,140,146 B2 * | 11/2006 | Gill | A01K 83/06 | 43/42.39 |
| 7,162,829 B2 * | 1/2007 | Braaten | A01K 85/00 | 43/42.23 |
| 7,234,266 B2 * | 6/2007 | Thomas | A01K 85/00 | 43/42.02 |
| D548,302 S * | 8/2007 | Steckelberg | D22/133 | |
| 7,260,913 B2 * | 8/2007 | Becker | A01K 85/01 | 43/17.6 |
| 7,424,786 B1 * | 9/2008 | Nelson | A01K 83/00 | 43/42.39 |
| 7,596,901 B1 * | 10/2009 | Johnson | A01K 91/10 | 114/298 |
| 7,614,178 B2 * | 11/2009 | Hoyt | A01K 85/01 | 43/42.31 |
| 7,637,050 B2 * | 12/2009 | Brick | A01K 85/16 | 43/42.09 |
| 7,866,084 B1 * | 1/2011 | Nelson | A01K 85/00 | 43/42.36 |
| 8,186,096 B2 * | 5/2012 | Rubin | A01K 91/04 | 43/42.39 |
| 8,915,012 B2 * | 12/2014 | Burdick | A01K 85/18 | 43/42.09 |
| 9,402,379 B2 * | 8/2016 | Bechtold | A01K 83/00 | |
| 2001/0045048 A1 * | 11/2001 | Johnson | A01K 85/00 | 43/42.39 |
| 2005/0217165 A1 * | 10/2005 | Anderson | A01K 85/00 | 43/42.09 |
| 2006/0048439 A1 * | 3/2006 | Usui | A01K 85/14 | 43/42.11 |
| 2006/0137239 A1 * | 6/2006 | Link | A01K 91/06 | 43/44.97 |
| 2007/0119092 A1 * | 5/2007 | Gruber | A01K 83/00 | 43/44.83 |
| 2007/0271838 A1 * | 11/2007 | Lowiecki | A01K 85/02 | 43/42.39 |
| 2008/0022581 A1 * | 1/2008 | Link | A01K 91/06 | 43/44.97 |
| 2008/0202018 A1 * | 8/2008 | Gill | A01K 85/00 | 43/42.43 |
| 2008/0250693 A1 * | 10/2008 | Krueger | A01K 85/00 | 43/42.39 |
| 2009/0077859 A1 * | 3/2009 | Aylsworth | A01K 85/00 | 43/42.39 |
| 2015/0007483 A1 * | 1/2015 | Thorne | A01K 85/00 | 43/42.03 |

FOREIGN PATENT DOCUMENTS

| | | | | |
|---|---|---|---|---|
| EP | 1867229 | | 12/2007 | |
| EP | 1867229 A1 * | | 12/2007 | A01K 83/06 |
| EP | 3281522 A1 * | | 2/2018 | |
| FR | 2587172 A1 * | | 3/1987 | A01K 85/00 |
| JP | 10117636 | | 5/1998 | |
| JP | 10117636 A * | | 5/1998 | |
| JP | 10229785 | | 5/1998 | |
| JP | 10229785 A * | | 9/1998 | |
| JP | 11048285 | | 2/1999 | |
| JP | 11048285 A * | | 2/1999 | |
| JP | 2000139273 | | 5/2000 | |
| JP | 2000139273 A * | | 5/2000 | |
| JP | 2000270716 | | 10/2000 | |
| JP | 2000270716 A * | | 10/2000 | |
| JP | 2001045918 | | 2/2001 | |
| JP | 2001045918 A * | | 2/2001 | |
| JP | 2002142613 | | 5/2002 | |
| JP | 2002142613 A * | | 5/2002 | |
| JP | 2002153167 | | 5/2002 | |
| JP | 2002153167 A * | | 5/2002 | |
| JP | 2009125069 | | 6/2009 | |
| JP | 2009125069 A * | | 6/2009 | |
| JP | 2011172500 | | 9/2011 | |
| JP | 2011172500 A * | | 9/2011 | |
| JP | 2012050336 | | 3/2012 | |
| JP | 2012050336 A * | | 3/2012 | |
| JP | 2017085898 A * | | 5/2017 | |
| KR | 101353056 | | 1/2014 | |
| KR | 101353056 B1 * | | 1/2014 | |
| KR | 20140121774 | | 10/2014 | |
| KR | 20140121774 A * | | 10/2014 | |
| WO | 2005029953 | | 4/2005 | |
| WO | WO-2005029953 A1 * | | 4/2005 | A01K 85/00 |

* cited by examiner

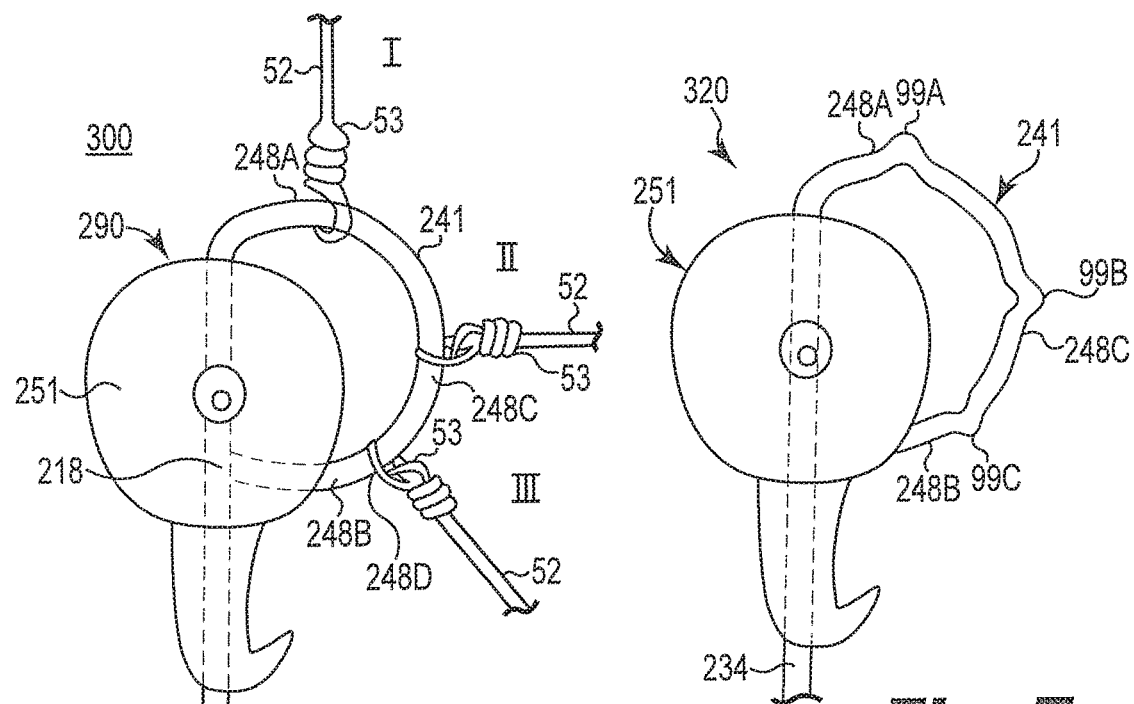
Fig. 5A
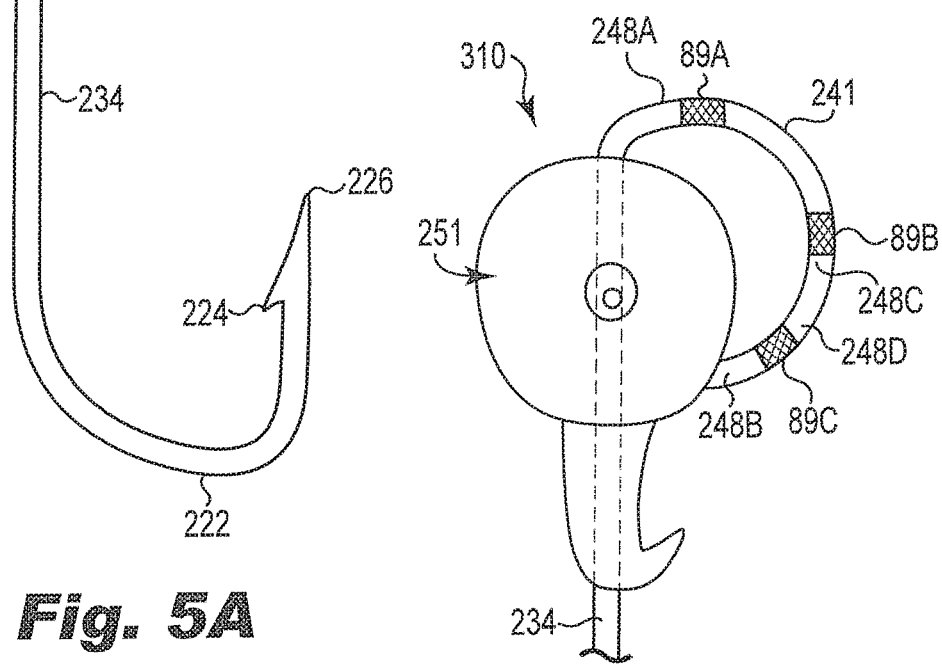
Fig. 7
Fig. 6

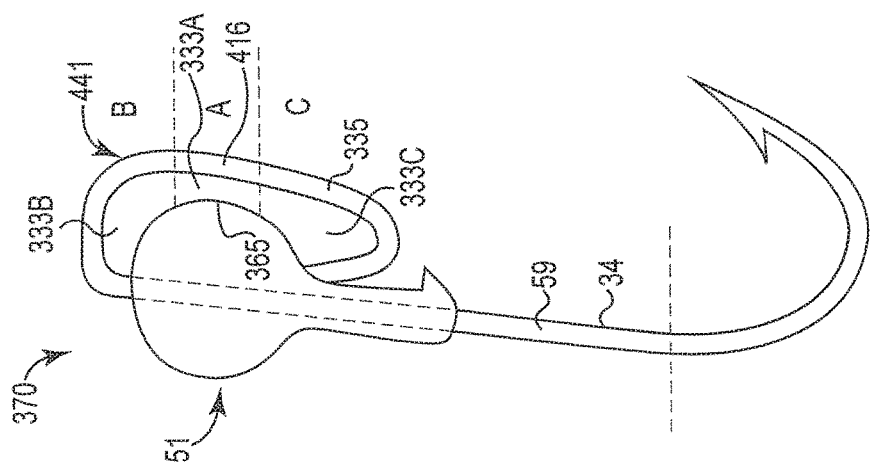
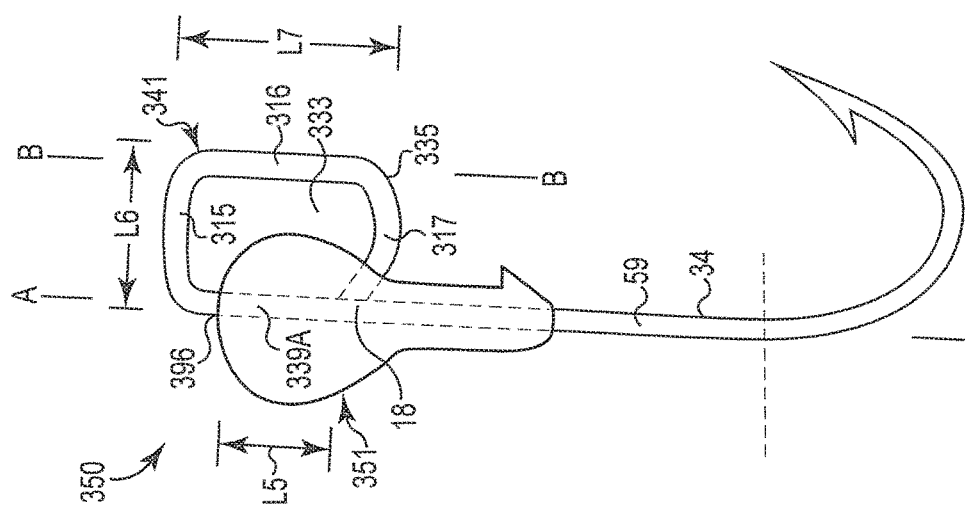
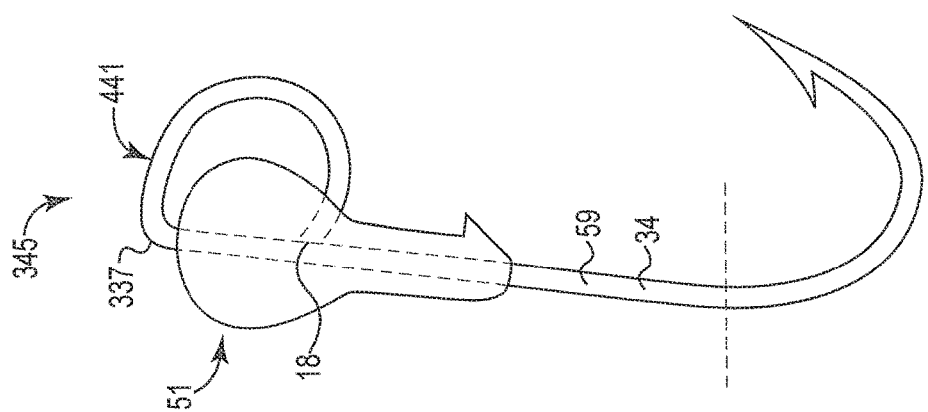

FISHING HOOK WITH TIE RAIL

CROSS-REFERENCE TO RELATED APPLICATIONS

This Patent Application is a Continuation of U.S. patent application Ser. No. 13/800,438, filed Mar. 13, 2013, entitled "FISHING HOOK WITH TIE RAIL" which claims benefit to U.S. Provisional Application No. 61/696,863, filed Sep. 5, 2012, entitled "FISH HOOK" both of which are incorporated herein by reference.

BACKGROUND

Each fishing outing is unique because of changing fish appetites and varying levels of aggression, which can be attributed to altered environmental conditions such as barometric pressure, light, wind, moon phase, seasons and other variables. The appetite and aggression level also are affected by localized influences, such as water clarity, water temperature, salinity, acidity, depth, natural prey availability, population density and other variables. In addition, each fish population has its own affinity for various bait presentations.

All these factors will change over a year, many within thirty minutes. Predicting the response of fish to these changes is difficult. Most fishermen use a trial-and-error process to determine which lure and/or bait, as well as its presentation, will be effective for a particular outing. Because fishermen endeavor to catch fish and often to release them again, their ability to stay in sync with the preferences of their prey will dictate the degree of their success.

With conventional lures (e.g., hooks, jigs, etc.), it can be rather challenging to quickly change lures or to replace a lure lost due to a broken line. This challenge is exacerbated under some conditions, such as being in a moving boat, cold temperatures, falling precipitation (e.g. rain), poor visibility, etc.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 5A is a side plan view schematically illustrating different orientations of presentation for the fishing hook assembly, according to an embodiment of the present disclosure.

FIG. 6 is a side plan view schematically illustrating a fishing hook assembly with an example tie rail configuration, according to an embodiment of the present disclosure.

FIG. 7 is a side plan view schematically illustrating a fishing hook assembly with another example tie rail configuration, according to an embodiment of the present disclosure.

FIG. 8 is a side plan view schematically illustrating a fishing hook assembly, according to an embodiment of the present disclosure.

FIG. 9 is a side plan view schematically illustrating a fishing hook assembly, according to an embodiment of the present disclosure.

FIG. 10 is a side plan view schematically illustrating a fishing hook assembly, according to an embodiment of the present disclosure.

DETAILED DESCRIPTION

Figure 1:
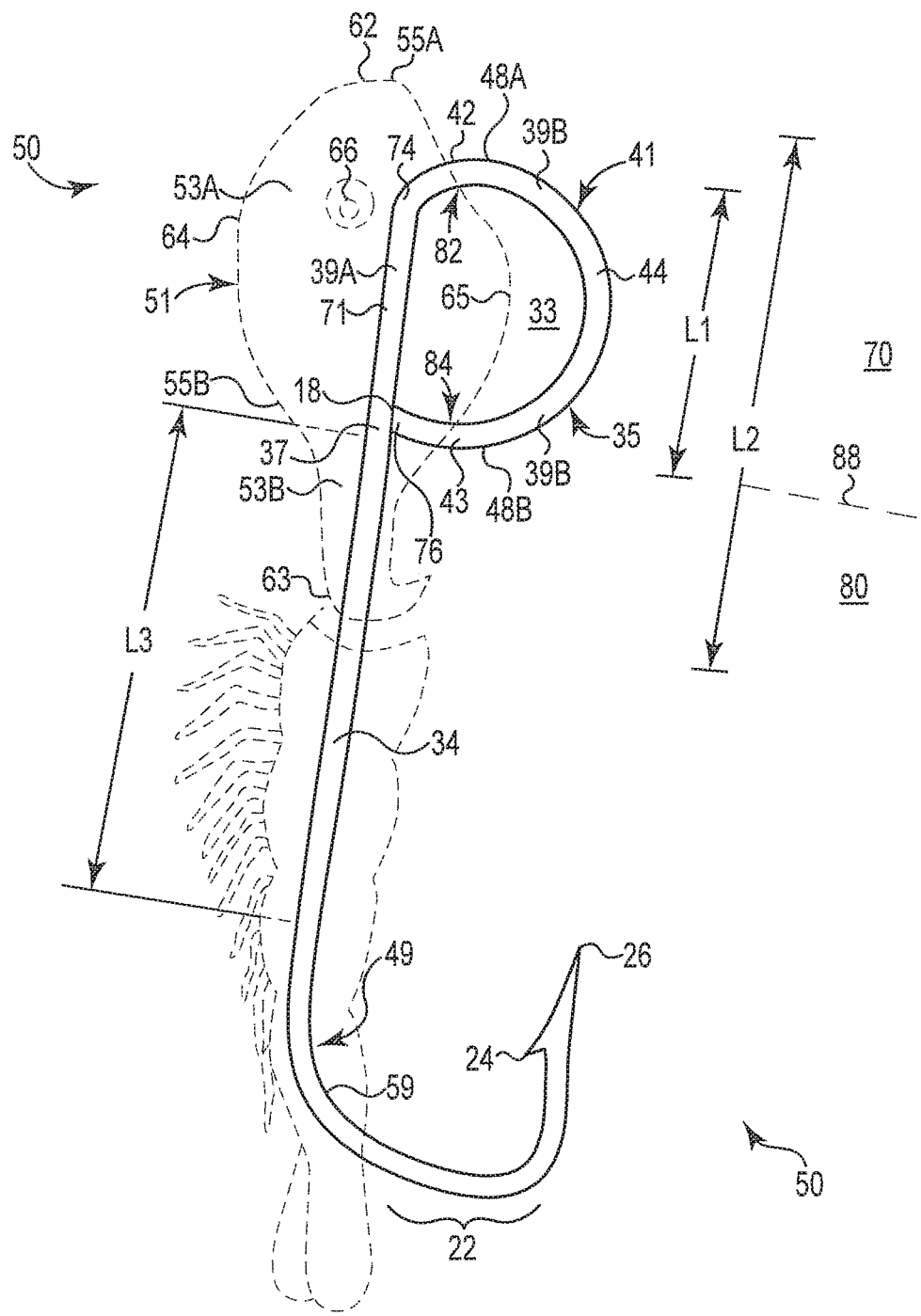
FIG. 1 is a side plan view schematically illustrating a fishing hook assembly, according to an embodiment of the present disclosure.

In the following Detailed Description, reference is made to the accompanying drawings, which form a part hereof, and in which is shown by way of illustration specific embodiments which may be practiced according to the present disclosure. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense.

Embodiments of the present disclosure enable fishermen to catch more fish because they can spend more time with their fishing lure or hook in the water and with their hook or lure being properly placed for the preferred bait presentation.

In one embodiment, a fishing hook assembly includes a hook element including a tie rail, which defines an enlarged line-pass-through area. In one example, the line-pass-through area is substantially larger than a transverse cross-sectional area of a fishing line to be inserted into and through the line-pass-through area. This arrangement provides tremendous visibility while maneuvering the end of the fishing in and about the tie rail when tying the fishing line to the tie rail. In addition, because the enlarged line-pass-through area provides such a large target for inserting the end of the fishing line, it becomes easy to thread the end of the fishing line through the line-pass-through area. Thus, even under challenging conditions such as a wet or cold environment, or low visibility during nighttime, a fisherman can quickly tie a line onto the tie rail and resume fishing quickly. Moreover, this enlarged line-pass-through area is particularly helpful for those with reduced manual dexterity due to arthritis or other medical conditions and/or those having visual impairments.

Furthermore, a fishing hook assembly in accordance with embodiments of the present disclosure enables immediate, quick tying of line to the tie rail by avoiding the conventional process of puncturing a conventional eyelet with a sharp object to penetrate dried paint in the eyelet that is typically present in conventional eyelets of a fishing hook.

The large line-pass-through area in a fishing hook assembly (in embodiments of the present disclosure) readily accommodates fishing line of varying diameters, such as larger diameter lines, and of different flexibilities, such as higher flexibility lines.

A fishing hook assembly, according to embodiments of the present disclosure, also enables a fisherman to achieve several different bait presentations without having to untie or retie their fishing line to a different hook or jig. In particular, a tie rail of the fishing hook assembly is configured with a length and curvature that enables orienting the tied line at significantly different angles relative to a geometric center of the line-pass-through area (or relative to a center of gravity of a jig head) and/or orienting the tied line at different positions along a length of the head portion of the fishing hook assembly. This ability, in turn, enables achieving substantially different bait presentations without retying the fishing line relative to the tie rail. Accordingly, in one aspect, the tie rail of a fishing hook assembly provides a panoramic element, about which one can slidably move the hook and bait into a vertical presentation, a horizontal presentation, or other angled presentations.

In stark contrast to embodiments of the present disclosure, conventional eyelets enable just one bait presentation such that one must switch hooks to vary the presentation of the bait, which in turn requires removing the hook from the line and retying a new hook onto the line. Changing between fishing hooks typically involves cutting the fishing line, removing the live or artificial bait from the old fishing hook, possibly cleaning paint out of the eyelet of a new fishing hook, threading the conventional eyelet of the new fishing hook, re-tying the line to the new fishing hook and reattaching the old live or artificial bait. When the live bait is damaged from the removal process, or from environmental factors such as sunlight or dry air, new bait may need to be retrieved and attached. All of these steps take time that could otherwise be spent actually fishing.

However, a tie rail of a fishing hook assembly, according to embodiments of the present disclosure, overcomes these obstacles by enabling quick, selective repositioning of the tied line along the tie rail to achieve different bait presentations. Given the speed with which favorable fishing conditions can change and/or the challenge in identifying which presentation to which fish will respond, embodiments of the present disclosure can dramatically enhance the ability of the fishermen to test for effective presentations while adapting to changing conditions—all while spending much more time with their lures in the water.

These embodiments, and additional embodiments, are described below in association with FIGS. 1-16.

FIG. 1 illustrates a fishing hook assembly 50, according to an embodiment of the present disclosure.

In one example, the example fishing hook assembly 50 is formed from a hook element 49 comprising a single shaft 59 of generally rigid material. In one aspect, the hook element 49 can be embodied in a range of sizes, lengths, and colors. In some embodiments, the fishing hook assembly 50 includes a jig head 51 coupled to the hook element 49. In one embodiment, jig head 51 is molded of a material having a specific gravity which, when coupled with the hook element 49, will effect a specific gravity so as to allow the sinking of the complete fishing hook 50 when placed in water. The head 51 is molded in various sizes, shapes and colors to the hook element 49.

As shown in at least FIGS. 1-3A, shaft 59 of hook element 49 defines a head portion 70 and a tail portion 80. Dashed line 88 denotes the boundary between the head portion 70 and tail portion 80. Tail portion 80 includes a generally straight shank portion 34 and a curved portion 22 extending proximally from the generally straight shank portion 34. Curved portion 22 terminates in a free end 26. In one aspect, free end 26 includes a barb 24. In one aspect, the generally straight shank portion 34 has a length L3, as shown in FIG. 1.

As further shown in FIGS. 1-3A, the shaft 59 of hook element 49 also extends distally in the opposite direction away from tail portion 80, with shaft 59 further defining the head portion 70 of hook element 49. Accordingly, the head portion is located at a generally opposite portion of shaft 59 relative to the tail portion 80. In one aspect, head portion 70 includes a tie rail 41. In general terms, the tie rail 41 is located at an opposite end of the hook element 49 relative to the free end 26. In one aspect, the head portion 70 is formed as an extension of the shank portion 34 in which the shaft 59 is formed into a loop portion 35 to create tie rail 41 with a terminal end 76 of the shaft 59 forming a connection point 18 adjacent a distal end 37 of shank portion 34. In one aspect, loop portion 35 includes a generally straight segment 39A (extending distally from, and having a common longitudinal axis with, shank portion 34) and a generally semi-circular segment 39B that connects or extends from the generally straight segment 39A. Accordingly, in one embodiment, the fishing hook assembly 50 comprises a unitary, elongate article formed solely from singular shaft 59. However, in other embodiments, the various components of fishing hook assembly 50 can be formed of separate parts that are connected together.

Figures 2A, 2B:
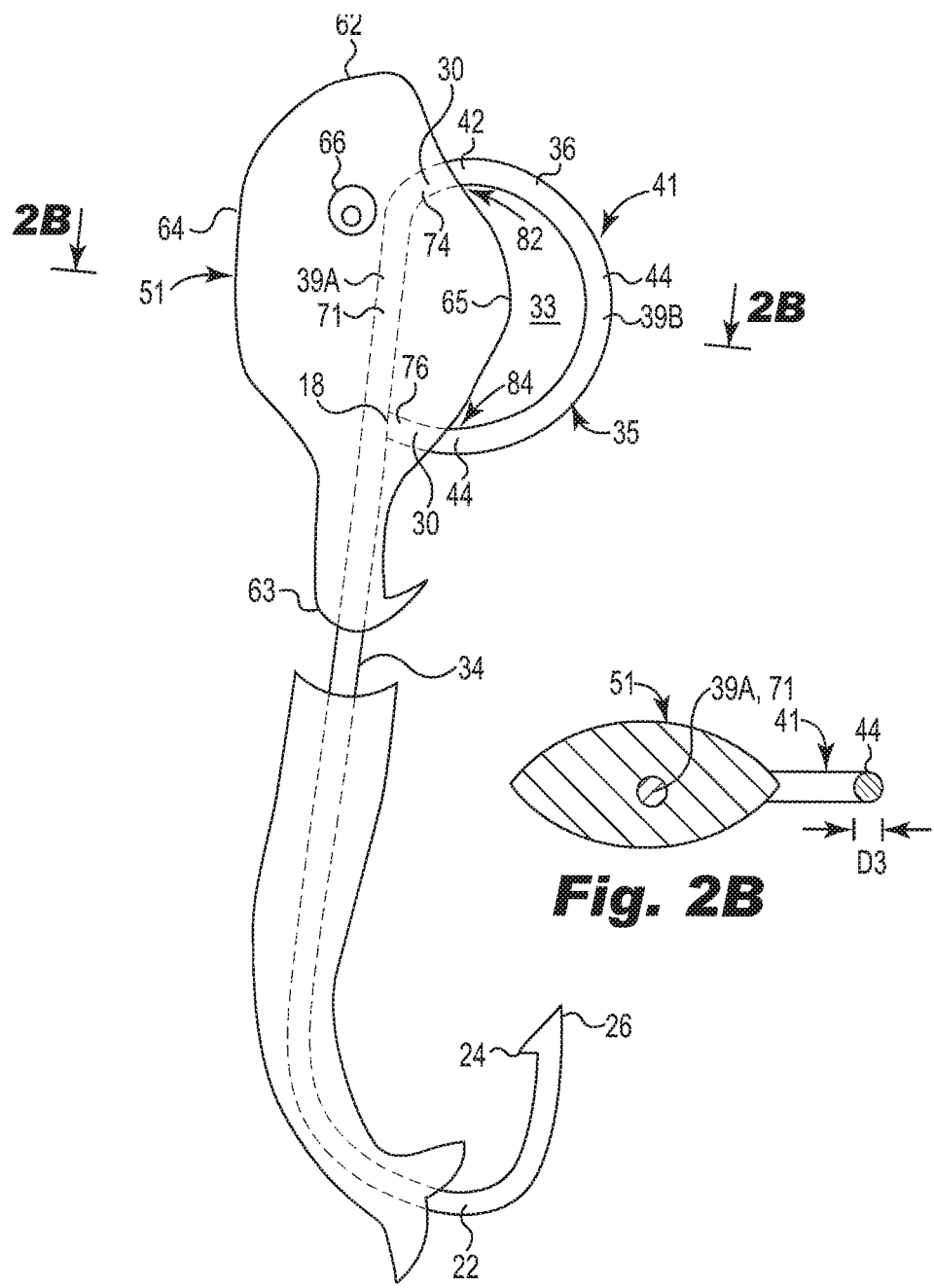
FIG. 2A is a side plan view schematically illustrating a fishing hook assembly, according to an embodiment of the present disclosure.
FIG. 2B is a sectional view as taken along lines 2B-2B of FIG. 2A, schematically illustrating a fishing hook assembly, according to an embodiment of the present disclosure.
Figure 3A:
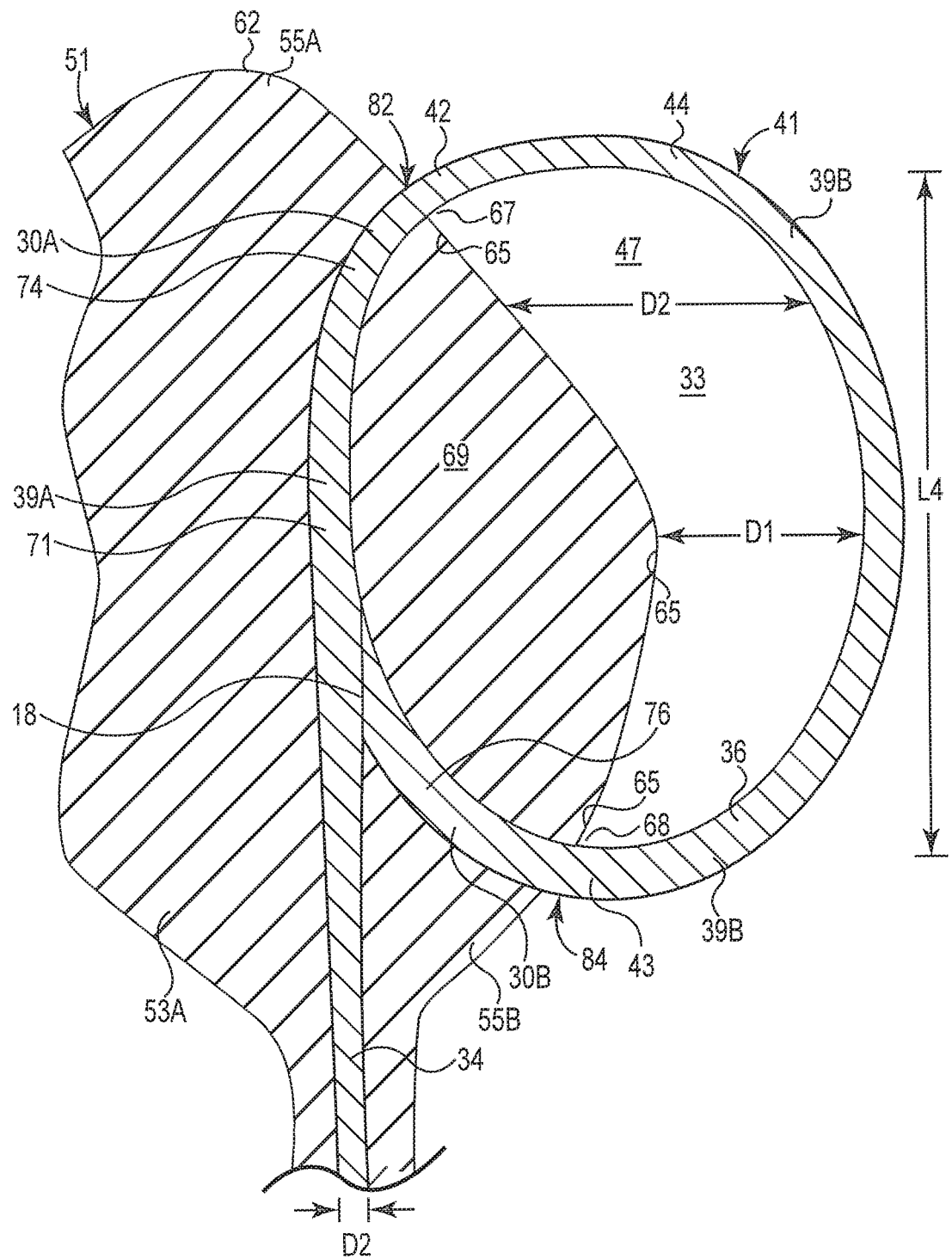
FIG. 3A shows an enlarged, partial sectional side view that schematically illustrates a head portion of a fishing hook assembly, according to an embodiment of the present disclosure.

As further shown in FIGS. 1-3A, a portion of the semicircular segment 39B of loop portion 35 that is not enclosed within jig head 51 defines the tie rail 41. In one embodiment, tie rail 41 defines a body 44 that extends between an exposed first end portion 42 and an exposed opposite, second end portion 43. While tie rail 41 can be formed in a variety of shapes, the tie rail 41 shown in FIGS. 1-3A has a generally arcuate shape approximating a semicircle. In one aspect, as shown in FIG. 3A, the first end portion 42 of tie rail 41 forms a junction 82 at perimeter portion 67 of head 51 and the second end portion 43 of tie rail 41 forms a junction 84 at perimeter portion 68 of head 51.

In general terms, a display portion 53A of jig head 51 corresponds to a portion of jig head 51 that extends distally forward from the junction 18 with a tail portion or non-display portion 53B of jig head 51 extending proximally away from the junction 18. With this in mind, in one embodiment, as shown in FIG. 1, a distal end 55A of a display portion 53A of jig head 51 is located distally beyond a distal end 48A of the tie rail 41. In one aspect, this configuration aids in minimizing the visual impact of tie rail 41 to a fish approaching fish hook assembly 50. In some embodiments, as shown in FIG. 1, a proximal end 55B of the display portion 53A of the head 51 is located at generally the same position as proximal end 48B of tie rail 41. This configuration further aids in minimizing the visual impact of tie rail 41 to a fish approaching fish hook assembly 50. In another aspect, the non-display portion 53B of jig head 51 is sized and shaped for mounting a plastic worm or other mountable lure element. The non-display portion 53B includes a barb 57 to facilitate removably securing the lure element onto the non-display portion 53B and relative to the shank portion 34 of hook element 49.

In one embodiment, the entire jig head 51 includes distal end 62 and a proximal end 63 with the entire jig head 51 having a length L2, as shown in FIG. 1.

Accordingly, the respective first and second end portions 42, 43 of tie rail body 44 are spaced apart from each other along a circumferential surface 65 (or perimeter portion) of jig head 51. This arrangement stands in sharp contrast to a conventional eyelet in which a base of the conventional eyelet defines a single point along the surface/perimeter of the jig head, such that the only location a line can be tied is at that single location point (defined by the conventional eyelet) along the perimeter of the jig head.

With further reference to FIGS. 1-3A, and as best seen in FIG. 3A, in another aspect of embodiments of the present disclosure, an interior area 33 is defined between surface 65 of jig head 51 (the surface 65 extending from junction 82 to junction 84) and the tie rail 41. The surface 65 corresponds to the perimeter portion of head 51 between junctions 82, 84 when viewed in cross-section or from a side view. With this configuration, a fishing hook assembly 50 in at least one embodiment of the present disclosure defines a tie passage or a line-pass-through area 33 (i.e. an area through which the line can be inserted/passed) that is at least partially defined by a surface of jig head 51.

In one embodiment, this line-pass-through area 33 is at least one order of magnitude greater that a cross-sectional area of a conventional eyelet (i.e., the opening through which a line is passed to enable tying the line to the ring-shaped metal that defines the eyelet). In other examples, this line-pass-through area 33 defines a cross-sectional area within a range of 10× to 30× larger than the cross-sectional area of a conventional eyelet. For purposes of this comparison, in one non-limiting example, the cross-sectional area of a conventional eyelet is about the same as the cross-sectional area of a shank portion of a hook element. In another non-limiting example provided for comparative purposes, the diameter of a conventional eyelet is generally the same as, or slightly larger than (e.g. 10% larger), the diameter of a fishing line suitable for use with the hook.

In one embodiment, the line-pass-through area 33 is about 3× to 10× greater than a cross-sectional area of the shank portion 34 of shaft 59. In another embodiment, the line-pass-through area 33 is about 3× to 10× greater than a cross-sectional area of the body portion 44 of tie rail 41. FIG. 2B shows a cross-sectional area of body portion 44 of tie rail and of segment 71 of shaft 59 with the cross-section taken along lines 2B-2B of FIG. 2A being transverse to a longitudinal axis of the body portion 44 and of the segment 71 of shaft 59. In embodiments in which shaft 59 has a uniform diameter (D3 in FIG. 2B) throughout its length, the cross-sectional area of body portion 44 of tie rail 41 is generally equal to the cross-sectional area of shank portion 34 or of segment 71 of shaft 59.

In one embodiment, the line-pass-through area 33 is about 5× to 10× greater than a cross-sectional area of the shank portion 34 of shaft 59 or than a cross-sectional area of the body portion 44 of tie rail 41. In some embodiments, the line-pass-through area 33 is about at least one order of magnitude (at least 10×) greater than a cross-sectional area of the shank portion 34 of shaft 59 or than a cross-sectional area of the body portion 44 of tie rail 41.

In one non-limiting example, the diameter (D3 in FIG. 2B) of the shaft 59 is about 0.2 to 0.6 millimeters, although it will be understood that greater diameter shafts can be used.

It will be understood that surface 65 of jig head 51 can take a variety of shapes and sizes, and that embodiments of the present disclosure are not strictly limited to the size and shape of the jig head 51 shown in FIGS. 1-3A.

In some embodiments, as best seen in FIG. 3A, the entire loop portion 35 (including segments 39A, 39B) of head portion 70 of fishing hook assembly 50 defines an area 47. Upon molding jig head 51 about at least a part of head portion 70 of hook element 49 into the position shown in FIGS. 1-3A, line-pass-through area 33 (the cross-sectional area defined between body 44 of tie rail 41 and surface 65 of head 51) defines at least one-half the cross-sectional area 47. As best seen in FIG. 3A, portion 69 of head 51 occupies the remaining area within loop portion 35. In one embodiment, line-pass-through area 33 is at least one-third of the cross-sectional area 47 defined by the entire loop 35. In yet other embodiments, the line-pass-through area 33 is greater than one-half of the cross-sectional area 47 defined by the entire loop 35.

Accordingly, with a portion of jig head 51 extending within loop 35 while still defining a line-pass-through area 33 that is substantially greater than the cross-sectional area within a conventional eyelet, the fishing hook assembly 50 (in accordance embodiments of the present disclosure) provides a substantially different structure than conventional eyelets on conventional jigs/hooks. With fishing hook assembly 50, ample space is provided to feed a line through the area 33, making tying a line 52 (FIG. 5A) on tie rail 41 significantly easier than on a conventional eyelet. The large line-pass-through area 33 makes it easier to see the hole through which the line is inserted, and makes it easier to actually pass the line 52 through the area 33. Moreover, because tie rail 41 has a length that extends along a significant portion of the full length of jig head 51 and tie rail 41 is curved to extend about a significant portion of the perimeter 65 of the jig head 51, the tie rail 41 permits selectively repositioning of a tied knot 58 and line 52 along the tie rail 41 (without having to cut or retie the line) into different positions to effect different presentations of the fishing hook 50 to the fish. This selective repositioning enabled via tie rail 41 is later described in more detail in association with FIGS. 5A-5D and 6-7.

In one embodiment, as shown in FIG. 1, the length (L1) at which tie rail 41 extends along head 51 is about one-half the total length (L2) of jig head 51 (including both the display portion 53A and non-display portion 53B).

As further shown in FIG. 3A, in one embodiment, when head 51 is molded onto the hook 50, the jig head 51 encapsulates a portion of the head portion 70 of hook element 59. In particular, straight portion 71 of shaft 59 (which corresponds to straight segment 39A of loop portion 35) is fully encapsulated but just part of the curved segment 39B of loop portion 35 becomes encapsulated by jig head 51. This configuration results in exposure of the remaining portion of segment 39B to define body 44 of tie rail 41. As best seen in FIG. 3A, in this arrangement, jig head 51 covers portions 30A, 30B of loop portion 35 to further secure loop portion 35 within jig head 51.

In one aspect, a method of forming a fishing hook assembly, according to an embodiment of the present disclosure, includes molding jig head 51 to encapsulate the junction 18 at which the distal end 76 of shaft 59 meets shaft 59 at the distal end 37 of shank portion 34 of shaft 59. In one aspect, this arrangement provides a more robust junction 18.

In another aspect, a method of forming a fishing hook assembly (according to embodiments of the present disclosure) includes molding a jig head 51 onto a loop portion 35 of a hook element 49 via securing the jig head 51 onto a straight segment 39A and onto a curved portion (portions 30A, 30B) of the loop portion 35 (extending from the straight segment 39A). In one aspect, the straight segment 39A and curved portions 30A, 30B become embedded within the jig head 51. In another aspect, with this molded jig head arrangement, a portion 69 of the head 51 occupies at least a portion of the total area 47 defined by the loop portion 35 while the remaining exposed area 33 defined by loop portion 35 (the area 33 that is not encapsulated by the jig head 51) defines the line-pass-through area 33 bounded between the tie rail 41 and the perimeter portion 65 of head 51 (that extends between junctions 82, 84 at which the tie rail protrudes from the surface 65 of head 51).

In some embodiments, body portion 44 of tie rail 41 (also referred to as semicircular segment 39B of loop portion 35) maintains a minimum spacing relative to the surface 65 of head 51 (i.e. that surface portion of head 51 that is opposite to and facing the body portion 44 of tie rail 41) that is represented by distance D1 in FIG. 3A. This minimum distance ensures adequate spacing to selectively reposition a tied knot along the rail 41. In some embodiments, distance D1 is also large enough to insert a line 52 into the tie passage (space between the tie rail 41 and surface 65 of head 51) and to adequately see the area into which line is to be inserted, etc.

In one embodiment, this minimum distance (D1) is substantially greater than a diameter (D3) of the shaft 59 of the hook element 49, such as the diameter of shank portion 34 or of body portion 44, as shown in FIG. 2B. In one non-limiting example, as shown in FIG. 3A, the distance (D1) is at least 2-3 times greater than a diameter (D3) of the shank portion 34 of shaft 59 of hook element 49. In another non-limiting example, the distance (D1) is at least 4×-9× times greater than a diameter (D3) of the shank portion 34 of shaft 59 of hook element 49. In another non-limiting example, the distance (D1) is at least an order of magnitude (e.g., 10×) greater than a diameter (D3) of the shank portion 34 of shaft 59 of hook element 49.

In some embodiments, jig head 51 has a shape such that a non-uniform distance exists between surface 65 of jig head 51 and tie rail 41, such as shown in FIGS. 1-3A. For instance, while the minimum distance D1 is merely 2×-3× the diameter of the body portion 44 of tie rail 41 at the point of the greatest width of jig head 51, at the more distal or more proximal regions of line-pass-through area 33, a distance (D2) extends between tie rail 41 and surface 65 of jig head, as shown in FIG. 3A. In one non-limiting example, distance D2 is about 4× to 5× of the diameter of body portion 44 of tie rail 41. This larger distance D2 provides a generally larger area to enable pass-through of line 52, while the narrower region at which distance D1 occurs still allows slidable movement of tied knot. In one aspect, this configuration of jig head 51, distribution of area 33, and shape of tie rail 41 together help to maintain a relatively low profile for tie rail 41 relative to jig head 51 (so that the presence of tie rail 41 becomes less conspicuous to fish) while still providing at least one large region (such as the region including the enlarged diameter D2) of the total pass-through area 33 that makes inserting a line 52 and tying a line 52 still relatively easy.

Of course, the shape of jig head 69 can be modified to increase or decrease the distance D1, whether or not there is any increase or decrease in the total line-pass-through area 33. In just one example, as described later in more detail in association with at least FIG. 10, a jig head 251 is formed with a shape so that substantially the entire pass-through-area 233 has a generally uniform distance D1 between a surface of the jig head 251 and the body portion 244 of tie rail 241. Among other benefits, such a configuration maximizes ease of tying as a preference over efforts to disguise the presence of tie rail 41, as in the embodiment of FIG. 3A.

The panoramic nature of tie rail 41 extending about a perimeter of jig head 51 can be expressed in several ways.

Figure 3B:
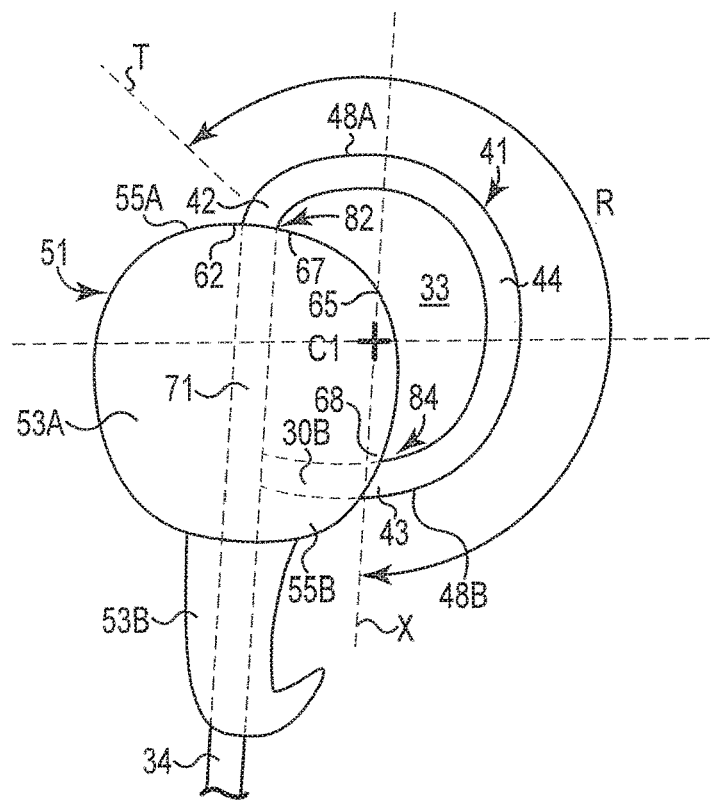
FIG. 3B shows a side plan view including a head portion of a fishing hook and a related geometric diagram assembly, according to an embodiment of the present disclosure.

In one embodiment, as further shown in FIG. 3B, the loop portion 35 of hook element 49 includes an approximate geometric center C1. Using center C1 as a reference point, FIG. 3B schematically illustrates one non-limiting example for fish hook assembly 50 in which the arc (represented by R) formed by body 44 of tie rail 41 (the exposed portion of loop portion 35) extends in a generally arcuate shape about 215 degrees. In this schematic representation, dashed line T marks a beginning point for arc R and dashed line X marks an ending point for arc R, such that the angle measured between lines T and X is about 215 degrees. It will be understood that in other examples, the angle swept by an arc of tie rail between junctions 82, 84 (assuming the approximate geometric center C1 of loop portion 35) can be more or less than 215 degrees.

In some embodiments, the angle swept by an arc (represented by R) of tie rail 41 is between about 90 to 270 degrees. In some embodiments, the angle swept by an arc (represented by R) of tie rail 41 is about 135 to about 215 degrees.

In one aspect, in the embodiment of FIG. 3B, the distal end 48A of tie rail 41 is located distally beyond the distal end 55A of head 51. As previously noted, in this configuration more emphasis is placed on a larger line-pass-through area 33 adjacent the distal end 55A of jig head 51 (instead of attempting to disguise the tie rail 41 by keeping a low visibility profile for tie rail 41, as occurs in the embodiment shown in FIGS. 1-3A).

In addition, as shown in FIG. 3B, in one embodiment, a proximal end 48B of tie rail 41 is located proximally relative to a geometric center (C1) of loop portion 35 and is located adjacent to a proximal end 55B of the display portion 53A of jig head 51.

Figure 3C:
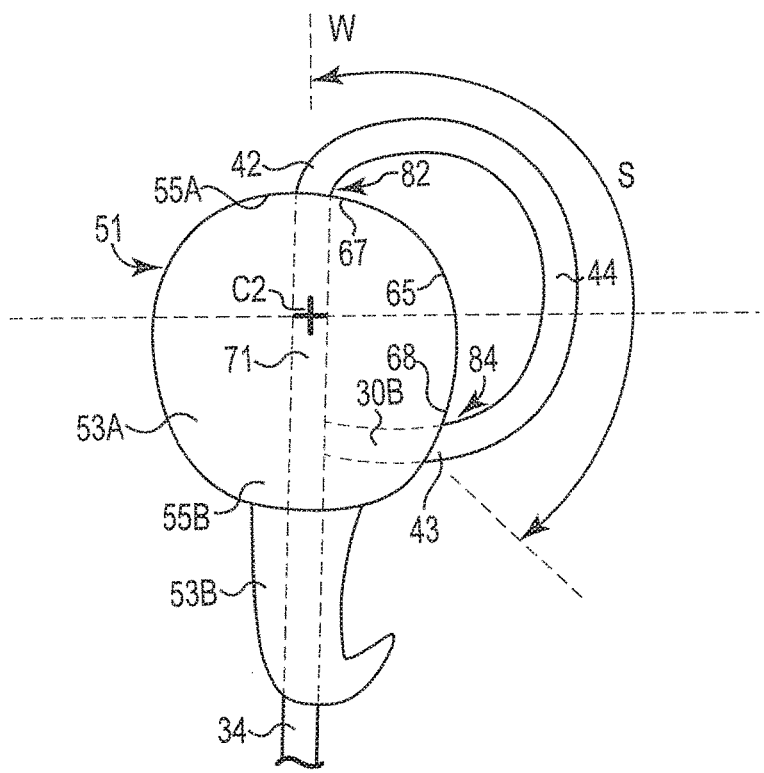
FIG. 3C shows a side plan view including a head portion of a fishing hook assembly and a related geometric diagram, according to an embodiment of the present disclosure.

In another example of expressing the panoramic nature of tie rail 41 extending about a perimeter of jig head 51, and as shown in FIG. 3C, the straight portion 71 of shaft 59 that extends from junction 82 to loop connection point 18 includes an approximate geometric center C2. Using center C2 as a reference point, FIG. 3C schematically illustrates one non-limiting example for fishing hook 50 in which the arc formed by body 44 of tie rail 41 (i.e., the exposed portion of loop portion 35) extends in a generally circular shape about 135 degrees from junction 82 to junction 84.

In this schematic representation, dashed line W marks a beginning point for arc S and dashed line Z marks an ending point for arc S, such that the angle measured between lines W and Z is about 135 degrees. It will be understood that in other examples, the angle swept by an arc of tie rail 41 between junctions 82, 84 (assuming the approximate geometric center C2) can be more or less than 135 degrees.

In some embodiments, the angle swept by an arc (represented by R) of tie rail 41 is between about 45 to 180 degrees.

Whether viewed from an assumed geometric center C1 or C2 (or some other geometric center), the tie rail 41 provides a panoramic element along which a tied line 52 is selectively movable relative to a perimeter or circumference of the head. In other words, tie rail 41 enables moving the tie location of a line about a perimeter of head 51 in a panoramic manner in which the angle of the tied line 52 is selectively varied relative to the jig head 51, which in turn enables one to achieve different bait presentations to a fish without having to cut and retie the line to a different hook as would be required with conventional hooks and eyelets.

In some embodiments, as shown in FIG. 3C, the proximal end 48B of tie rail 41 is located proximal to a center of gravity of the display portion 53A of jig head 51.

With reference to either FIG. 3B or 3C, in one example, because the end portions 42, 43 of tie rail 41 are spaced apart from each other by about one-third of the circumference (or perimeter) of jig head 51 and because the arc length of the body 44 of tie rail 41 is substantially greater than the arc length of head 51 between junctions 82, 84, area 33 defines an "eyelet area" that is substantially greater than the area within a conventional eyelet.

In one embodiment, the surface 65 of jig head 51 that occupies the space 47 within loop portion 35 of fishing hook assembly 50 is generally convex, as shown in at least FIG. 2B.

Figure 4B:
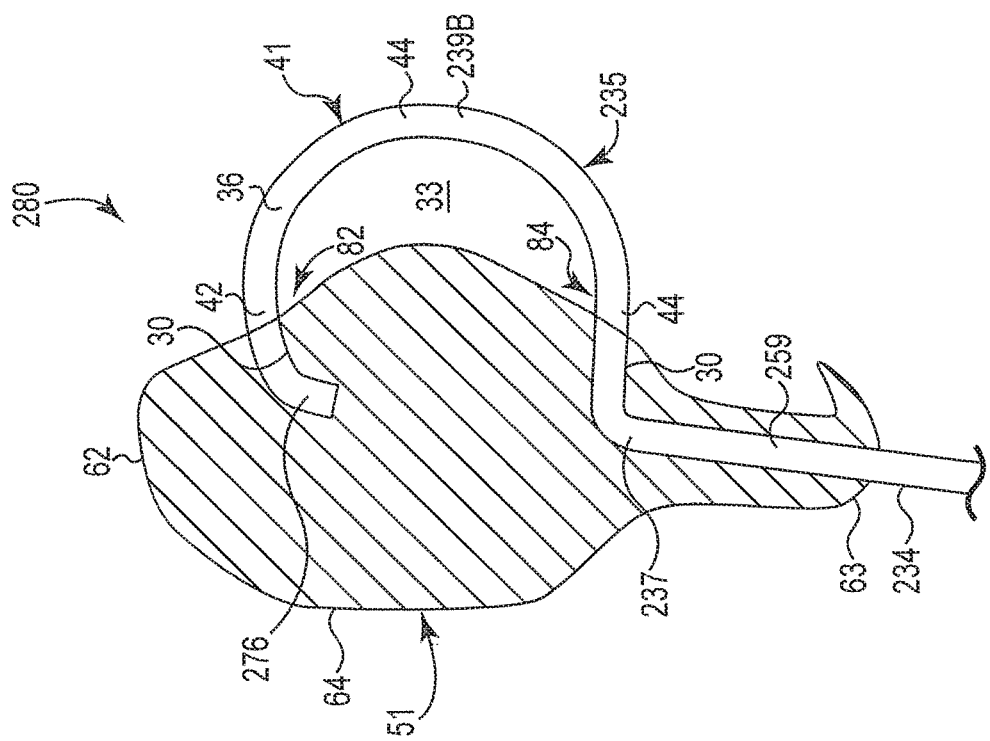
FIG. 4B shows an enlarged, partial sectional side view that schematically illustrates a head portion of a fishing hook assembly, according to an embodiment of the present disclosure.
Figure 4A:
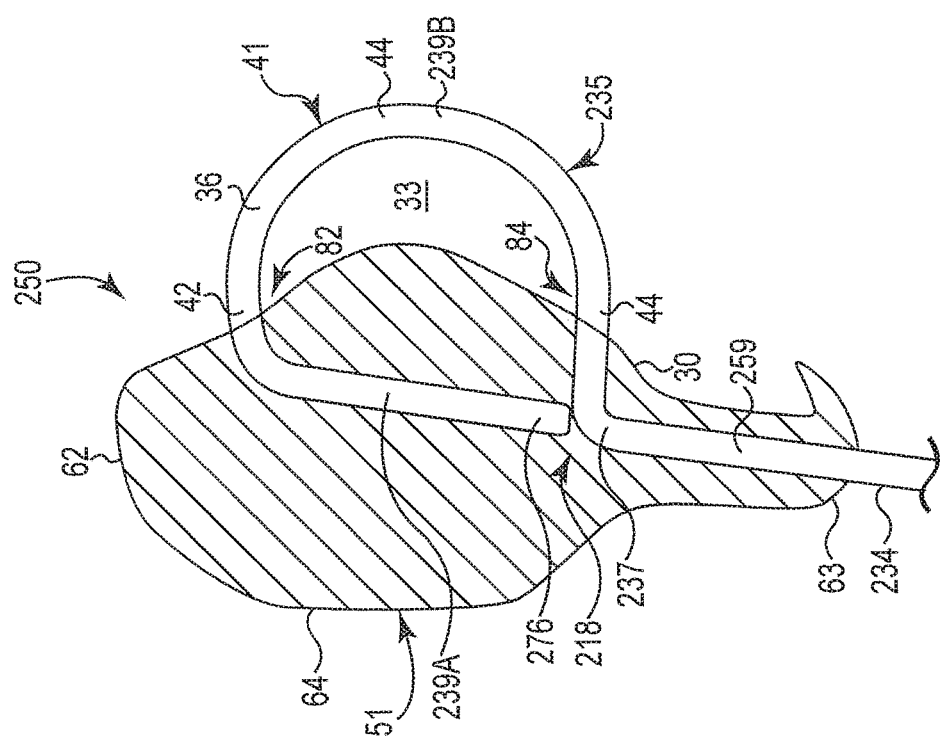
FIG. 4A shows an enlarged, partial sectional side view that schematically illustrates a head portion of a fishing hook assembly, according to an embodiment of the present disclosure.

FIG. 4A is a sectional side view of a fishing hook assembly 250, according to an embodiment of the present disclosure. As shown in FIG. 4A, the hook element 249 has substantially the same features and attributes as hook element 49 of FIGS. 1-3A except that loop portion 235 is formed in a reverse orientation relative to the formation of loop portion 35 in hook element 49. In particular, as shown in FIG. 4A, shaft 259 includes a generally straight shank portion 234 and a loop portion 235 extending proximally therefrom. However, in this embodiment, a generally semi-circular segment 239B extends directly from the distal end 237 of shank portion 234 to form tie rail 241. The shaft 259 extends further distally to form a generally straight segment 239A that extends through jig head 251 until a distal end 276 of generally straight segment 239A meets and forms a junction 218 against a side of shaft 259 adjacent distal end 237 of shank portion 234.

As shown in FIG. 4B, a fishing hook assembly 280 includes substantially the same features and attributes as hook assembly 250 of FIG. 4A, except that fishing hook assembly 280 omits generally straight portion 239A that otherwise extend through a central portion of jig head 251. Nevertheless, distal end 276 of shaft 259 that forms terminal portion of shaft 259 is shaped and oriented to become encapsulated within jig head 251, and thereby establish tie rail 241 in a fixed position relative to jig head 251.

Among other benefits, a tie rail of a fishing hook assembly in accordance with embodiments of the present disclosure enables a tied line to be slidably maneuvered into different positions along tie rail, as schematically represented in the diagram 300 of FIG. 5A, thereby resulting in quick and effective conversion to different bait presentations.

For illustrative purposes, it is assumed in FIGS. 5B, 5C, 5D, that the fishing hook assembly is submerged in the water and has sufficient weight to place line 52 under tension, thereby causing the fishing hook assembly to be suspended in the water below the surface of the water.

Figure 5B:
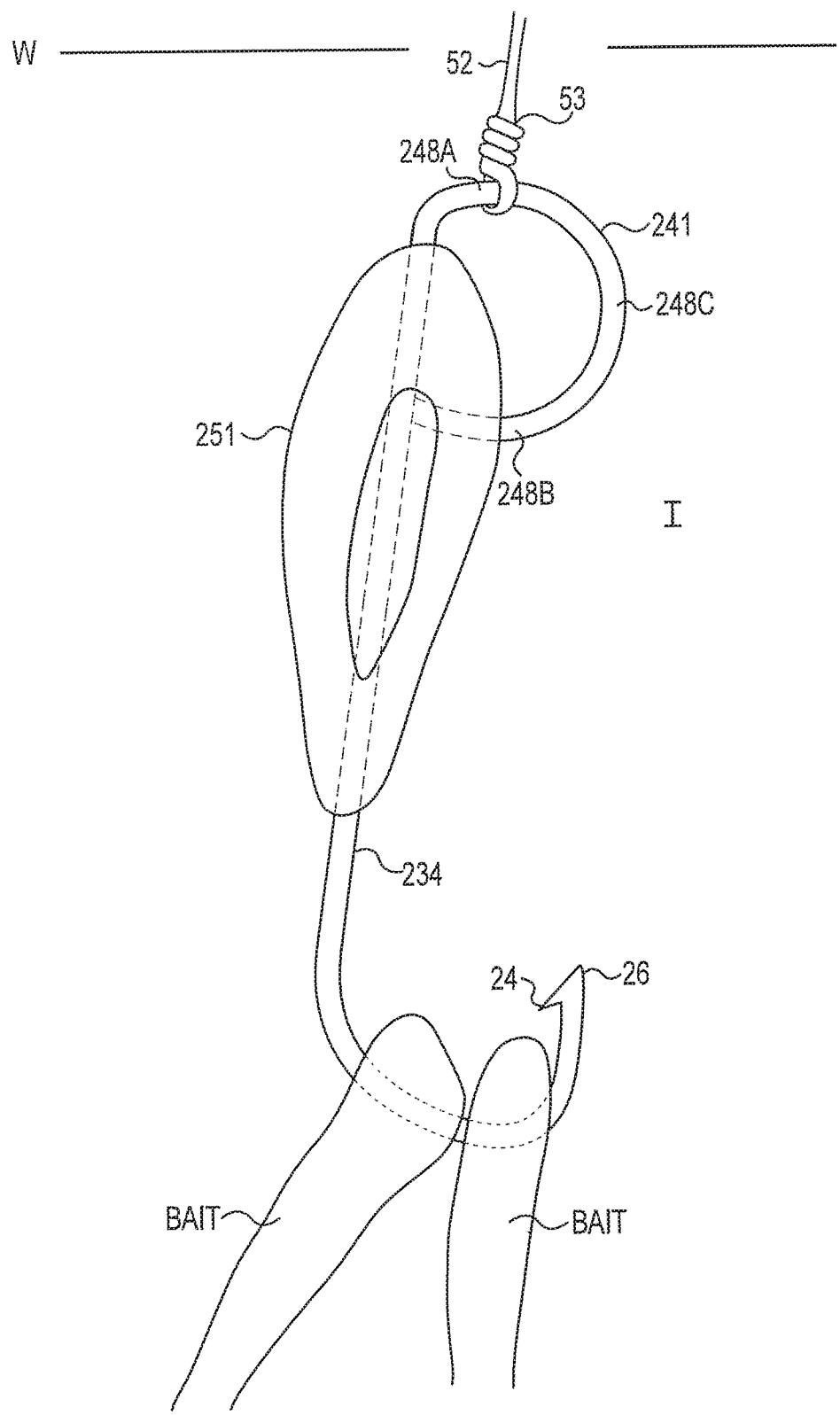
FIG. 5B is a side plan view schematically illustrating the fishing hook assembly in a generally vertical bait presentation, according to an embodiment of the present disclosure.
Figure 5C:
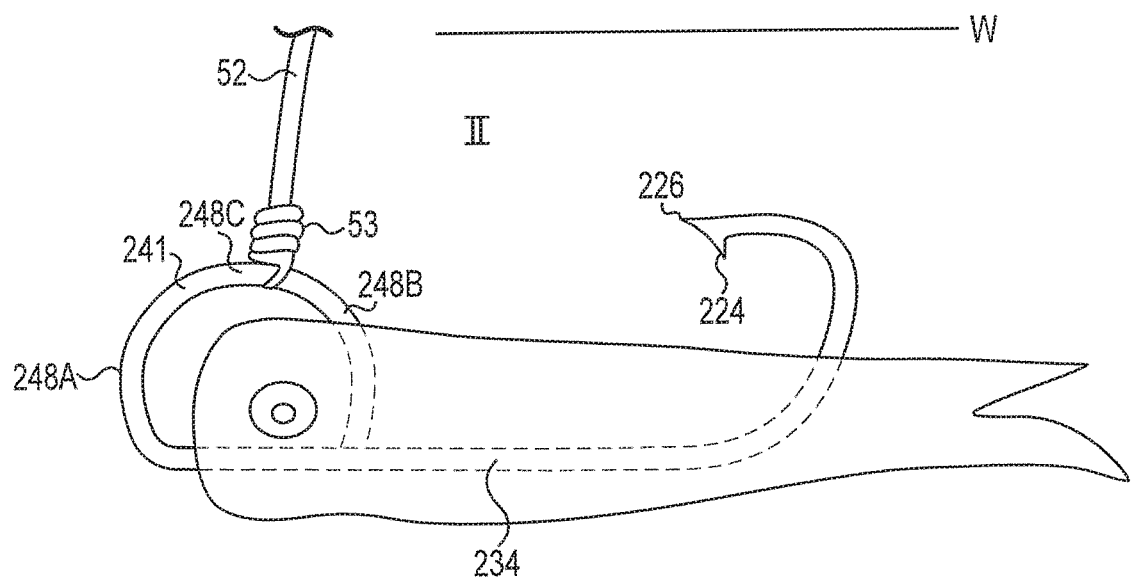
FIG. 5C is a side plan view schematically illustrating the fishing hook assembly in a generally horizontal bait presentation, according to an embodiment of the present disclosure.

As shown in FIG. 5A, in a first position (I), knot 53 of line 52 is positioned at a distal region of tie rail 241 to orient a longitudinal axis of line 52 to be parallel to a longitudinal axis of the generally straight shank portion 234 and to achieve a generally vertical bait presentation, as further shown in FIG. 5B. In a second position (II), knot 53 is positioned at an intermediate position along tie rail 241 to orient a longitudinal axis of line 52 to be generally perpendicular to a longitudinal axis of the generally straight shank portion 234 and to achieve a generally horizontal bait presentation, as further shown in FIG. 5C.

Figure 5D:
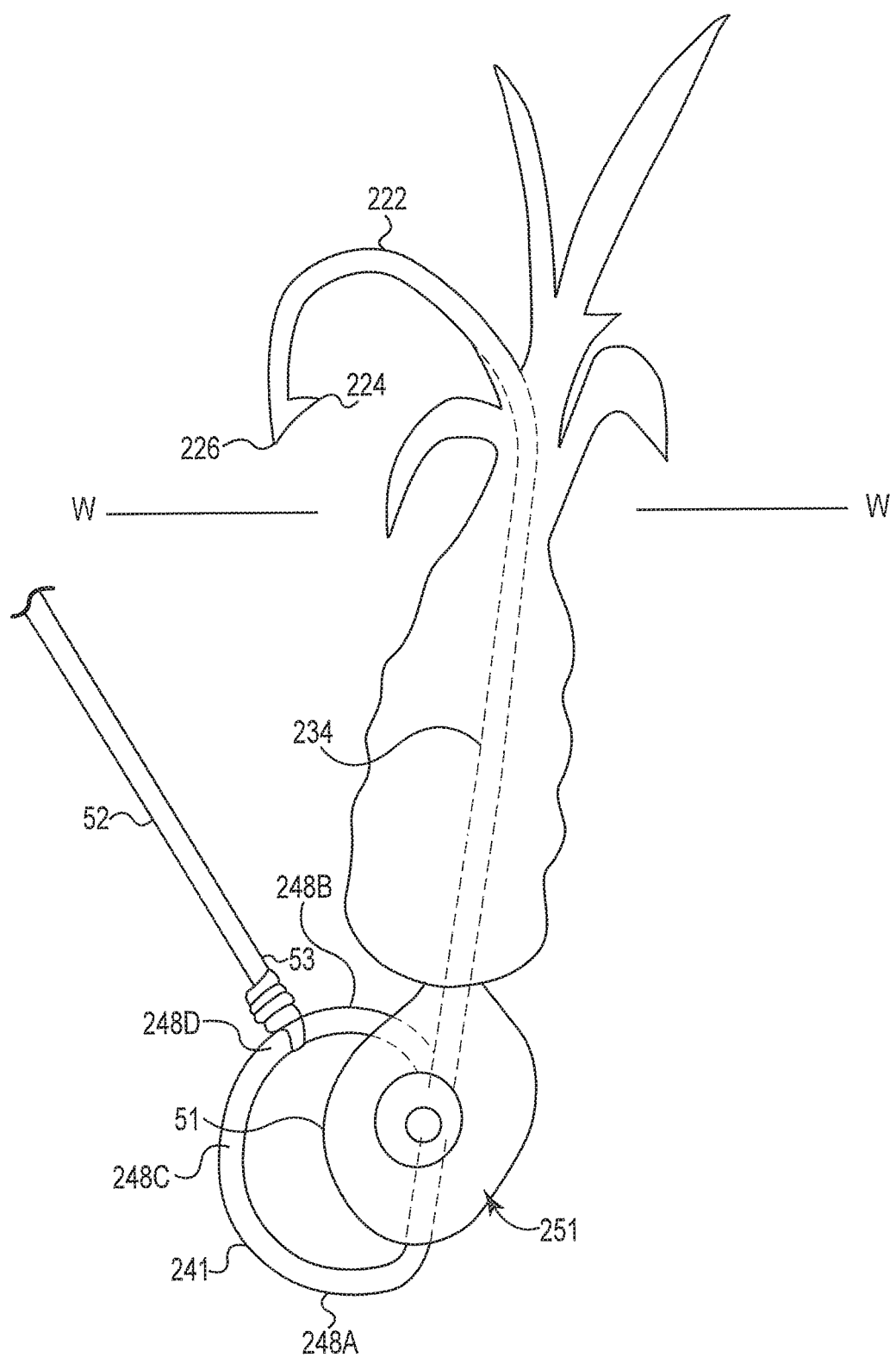
FIG. 5D is a side plan view schematically illustrating the fishing hook assembly in an angled bait presentation, according to an embodiment of the present disclosure.

In a third position (III), knot 53 of line 52 is positioned at a proximal region of tie rail 241 to orient a longitudinal axis of line 52 at an generally acute angle relative to the longitudinal axis of the generally straight shank portion 234 and to achieve a generally upside down bait presentation, as further shown in FIG. 5D. As shown in FIG. 5D, while line 52 may extend in a non-vertical orientation relative to surface of water (W), the bait and shank portion 234 of hook assembly 250 have a generally vertical orientation, except with jig head 251 pointing downward (instead of upward as in FIG. 5B).

Accordingly, upon removing fishing hook assembly 290 from the water, the fisherman can quickly and easily slide the knot 53 of tied line 52 between anyone of the different positions along tie rail 241 to achieve different bait presentations—all without having to untie and retie line 52, as would be required with conventional eyelets.

It will be understood that a size and shape of the tie rail 241 enables tied line 52 to be moved to positions other than those shown in FIGS. 5A-5D, thereby producing variations on the illustrated bait presentations.

Moreover, to further facilitate a fisherman to achieve preferred positioning of line 52 relative to tie rail 241 of fishing hook assembly 250 to produce a particular bait presentation, some embodiments of the present disclosure include visible marks at various locations along tie rail 241, as shown in FIG. 6. In general terms, each mark corresponds to a recommended location for positioning a tied knot of the fishing line in order to achieve a particular presentation, as described and illustrated in association with FIGS. 5A-5D.

Accordingly, FIG. 6 is a side view schematically illustrating a fishing hook assembly 310 with a tie rail 41 including an array of visible marks 89A, 89B, 89C (denoted by shaded portions) spaced apart along a length of tie rail 41. Each visible mark 89A, 89B, 89B corresponds to one of the orientations of line 52 that produce one of the respective example bait presentations shown in FIGS. 5B, 5C, 5D.

As shown in FIG. 6, the first two visible marks (89A, 89B) are separated by a 90 degree arc about tie rail 241. The first mark 89A is located at a distal end 248A of tie rail 41 so that fishing line 52 becomes aligned to be generally parallel to longitudinal axis of generally straight shank portion 34 of shaft 59, and the bait/hook achieves a generally vertical presentation relative to a surface of water (W), as shown in FIG. 5B. The second visible mark 89B is located at an intermediate portion 248C of tie rail 41 so that fishing line 52 becomes aligned to be generally perpendicular to a longitudinal axis of generally straight shank portion 34 of shaft 59, and the bait/hook achieves a generally horizontal presentation relative to a surface of water (W), as shown in FIG. 5C. Finally, the third visible mark 89CB is located at a more proximal portion 48D of tie rail 41 (between intermediate portion 248C and distal end 248B) so that fishing line 52 becomes aligned at an acute angle relative to a longitudinal axis of generally straight shank portion 34 of shaft 59, and the bait/hook achieves an angled, generally upside down presentation relative to a surface of water (W), as shown in FIG. 5D.

In some embodiments, there are more or less than three visible marks with each visible mark corresponding to an intended line orientation for bait presentation relative to a surface of water (W).

In another embodiment, the visible marks (89A, 89B, 89C) along tie rail 241, as shown in FIG. 6, also define portions having a different coefficient of static friction than non-marked locations. In one embodiment, the non-marked portions have a first coefficient of static friction and the marked portions (e.g., 89A, 89B, 89C) have a second coefficient of static friction, which is substantially greater than the first coefficient of static friction. In one example, the second coefficient of static friction is 15-30% greater than the first coefficient of static friction. As previously noted, a fisherman can use the marked portions 89A, 89B, 89C to achieve proper alignment of fishing line 52 along tie rail 41 in order to obtain a desired bait presentation. In addition, the greater coefficient of static friction at the marked locations helps to ensure that the tied line 52 remains removably secured at the intended location during fishing.

In one embodiment, the differing coefficients of static friction can be achieved by varying a level of polish on surface of the metal forming shaft 59. In some embodiments, such differing coefficients of static friction are achieved by applying a lubricous coating to produce the segments having a lower coefficient of static friction and/or by applying a non-abrasive, non-slip coating to the portions intended to have a higher coefficient of static friction.

In some embodiments, the designated locations (89A, 89B, 89B) along tie rail 241 do not include any visible marking but still define regions having the higher, second coefficient of static friction to facilitate releasably securing the line 52 at the recommended orientations corresponding to the different bait presentations. The user can identify these locations by sensing the increased resistance when sliding the tied knot 58 of line 52 through those regions.

As shown in FIG. 7, in one embodiment, instead of employing an array of visible marks 89A, 89B, 89C (as in FIG. 6) to designate the preferred presentation orientations, a tie rail 241 of a fishing hook assembly 320 includes an array of indents (e.g. recesses or small bends formed in, and along a length of, the rail 241) 99A, 99B, 99C to designate suggested knot-positioning locations (i.e. tie locations) that correspond to the different orientations of the preferred bait presentations, such as those shown in FIGS. 5A-5D. In one aspect, the indents define small bends exhibiting a smooth curvature to minimize stress concentrations and/or to minimize abrasion against fishing line tied onto tie rail 241.

In one example, tie rail 241 includes three different indents 99A, 99B, 99C arranged in series, and spaced apart from each other, along an arc length of the tie rail 241. The first two indents (99A, 99B) are separated by 90 degrees about the arc length of tie rail 241. The first indent 99A is located at a distal end 248A of tie rail 241 so that fishing line 52 becomes aligned to be generally parallel to longitudinal axis of generally straight shank portion 234 of shaft 259, and the bait/hook achieves a generally vertical presentation relative to a surface of water (W), in a manner similar to that shown in FIG. 5B. The second indent 99B is located at an intermediate portion 248C of tie rail 41 (and interposed between the first and third indents 99A, 99C) so that fishing line 52 becomes aligned to be generally perpendicular to longitudinal axis of generally straight shank portion 234 of shaft 259, and the bait/hook achieves a generally horizontal presentation relative to a surface of water (W), in a manner similar to that shown in FIG. 5C. Finally, the third indent 99C is located at an more proximal portion 48D of tie rail 41 so that fishing line 52 becomes aligned at an acute angle relative to a longitudinal axis of generally straight shank portion 234 of shaft 259, and the bait/hook achieves an angled, generally upside down presentation relative to a surface of water (W), in a manner similar to that shown in FIG. 5D.

In another embodiment, while not depicted in FIG. 7, the indents are replaced with relatively short straight segments that would be readily, visually identifiable for aligning a fishing line with the particular segments to achieve a desired bait presentation.

It will be understood that greater or fewer knot-positioning locations (such as indents in FIG. 7 or marked portions in FIG. 6) can be employed than the three knot-positioning locations shown in FIG. 7 or 8. Moreover, it will be further understood that in some examples of the present disclosure the particular spacing between (or angles between) the marked locations (FIG. 6) or indents (FIG. 7) are not strictly limited to the spacing and/or angles shown in FIGS. 6 and 7, respectively.

Additional embodiments of the present disclosure are shown in FIGS. 8-10. In these embodiments, the fishing hook 50 comprises substantially the same features and attributes as fishing hook 50 previously shown and described in association with at least FIGS. 1-3A, except for head 151 having a general sphere shape rather than in the generally diamond shaped configuration in FIGS. 1-3A and/or the tie rail having different shapes.

FIG. 8 illustrates a fishing hook assembly 345, according to an embodiment of the present disclosure, which includes a right angle junction 337 defining a transition between a generally straight segment 439A and a distal portion 444 of a tie rail 441. In one aspect, this right angle junction 337 helps to prevent the knot 53 of line 52 from being moved to a position onto a top of jig head 51 and in which a vertical bait presentation could be compromised.

FIG. 9 schematically illustrates a fishing hook assembly 350, according to an embodiment of the present disclosure, including a tie rail 341. This fishing hook assembly 350 includes substantially the same features and attributes as the fishing hook assembly 50, previously described in association with at least FIGS. 1-3A, except for the noted differences. Tie rail 341 includes a first portion 315 that extends generally transverse to generally straight segment 339A (within jig head 51) of shaft 59 and a generally straight second portion 316 that extends generally parallel to the straight segment 339A of shaft 59. A third portion 317 extends proximally from second portion 316 and is oriented to form a loop portion 335 when an end of third portion 317 contacts shaft 59 to define the junction 18 within jig head 51.

In one embodiment, the second portion 316 has a length (L7) is greater than a length (L6) of the first portion 315. In some embodiments, second portion 316 has a length (L7) that is substantially greater than a length (L8) of straight portion 339A within display portion 53A of jig head 51. For purposes of this comparison, the straight segment 339A extends from junction 18 to point 396 at which shaft 59 exits a distal end 62 of jig head 51. In one embodiment, a longitudinal axis (represented by line B) of second portion 316 extends generally parallel to a longitudinal axis (represented by line A) of straight segment 339A (within head 51).

In one embodiment, the length (L7) of second portion 316 tie rail 341 is at least about 4× to 10× a diameter of shaft 59. This arrangement helps to define an elongate line-pass-through area 333 to provide maximal space for line insertion along a length of the jig head 51 and for knot tying.

In some embodiments, the total length of the tie rail 341 (the portion of loop portion 35 extending outside of head 51) is substantially greater than a length of the loop portion 35 that is encapsulated within jig head 51.

FIG. 10 is a side view that schematically illustrates a fishing hook assembly 370, according to an embodiment of the present disclosure. This fishing hook assembly 350 includes at least substantially the same features and attributes as the fishing hook assembly 50, previously described in association with at least FIGS. 1-3A.

As shown in FIG. 10, the fishing hook assembly 370 defines three different line-pass-through areas 333A, 333B, 333C with area 333A being interposed between the outer two area 333B, 333C. The three areas are schematically illustrated via the dashed lines separating zones A, B, C, with zone A corresponding to area 333A, zone B corresponding to area 333B, and zone C corresponding to area 333C. In one embodiment, area 333A is just wide enough (e.g. a distance about 2×-3× a diameter of shaft 59) to allow a knot 53 of tied line 52 to slidably pass by surface 365 of jig head at the narrowest point between surface 365 and portion 416 of tie rail 441. At the same time, line-pass-through areas 333B, 333C are each much larger than area 333A—with areas 333B, 333C having cross-sectional areas that are 4× to 10× larger than a cross-sectional area of shaft 59 (or a cross-sectional area of portion 416 of tie rail 441). Accordingly, fishing hook assembly 370 enables slidable positioning of a knot 53 about the full length of tie rail 441 (to achieve different bait presentations, such as, but not limited to those shown in FIGS. 5B, 5C, 5D) but maintains a low profile adjacent to a surface of jig head 51, thereby making the tie rail 441 less conspicuous to an approaching fish. However, the larger line-pass-through zones 333B, 333C are retained to enable quick tying of a line onto tie rail 441, in accordance with the general principles of the present disclosure.

Figure 11:
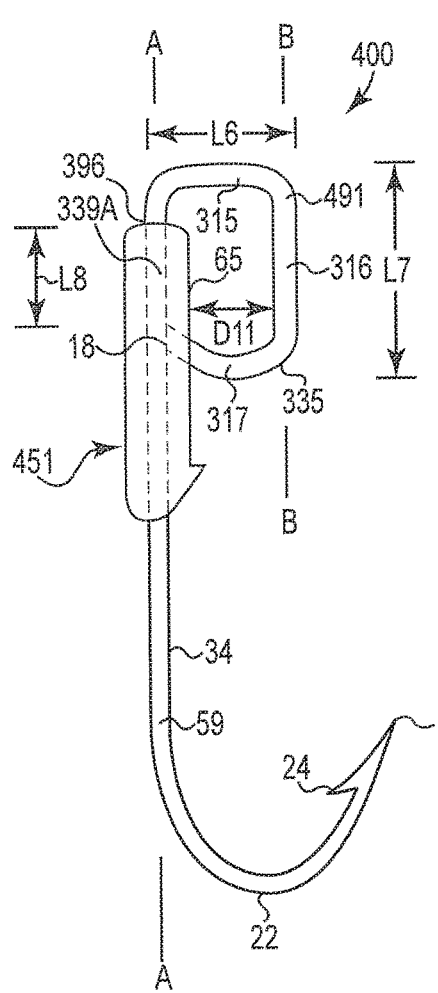
FIG. 11 is a side plan view schematically illustrating a fishing hook assembly, according to an embodiment of the present disclosure.

FIG. 11 is a side view schematically illustrating a fishing hook assembly 400, according to an embodiment of the present disclosure. In one embodiment, fishing hook assembly 400 includes substantially the same features and attributes as fishing hook assembly 350 of FIG. 9, except that jig head 451 has a narrow profile such that a generally uniform distance (D11) exists between a surface 465 of the jig head 451 and portion 316 of the tie rail 491 throughout the entire length of the jig head 451. In addition, in a manner similar to that shown in FIG. 9, a portion of the tie rail 491 protrudes outwardly from a distal end of jig head 451 at point 396. In another aspect, a portion of jig head 451 that encapsulates straight segment 339A of loop portion 335 has a length (L8).

Figure 12:
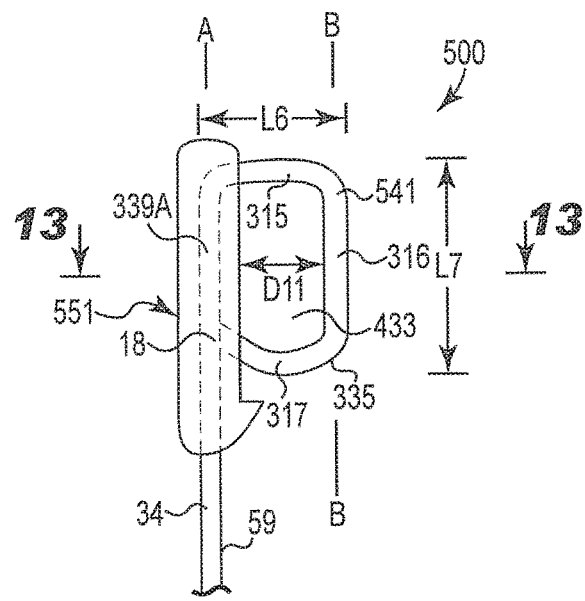
FIG. 12 is a partial side plan view schematically illustrating a head portion of a fishing hook assembly, according to an embodiment of the present disclosure.

FIG. 12 is a side view schematically illustrating a fishing hook assembly 500, according to an embodiment of the present disclosure. In one embodiment, fishing hook assembly 500 includes substantially the same features and attributes as fishing hook assembly 400 of FIG. 11, except that jig head 551 has longer body such that a distal end 462 of jig head 551 extends distally beyond portion 315 of tie rail 541 (the most distal portion of tie rail 541). In another aspect, jig head 451 completely encapsulates straight segment 339A of loop portion 335. This fishing hook assembly 500 further disguises the tie rail 541, making it less conspicuous (relative to the embodiment of FIG. 9) to an approaching fish while still maintaining a relatively wide and uniform line-pass-through area 433 that generally extends the length of the portion 316 of tie rail 541.

Figure 13:
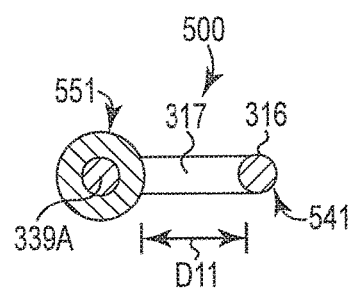
FIG. 13 is a sectional view taken along lines 13-13 of FIG. 12 that schematically illustrates a head portion of a fishing hook assembly, according to an embodiment of the present disclosure.

FIG. 13 is a sectional view taken along lines 13-13 of FIG. 12 further illustrating the fishing hook assembly 500, including the generally convex exterior of jig head 551.

Figure 14:
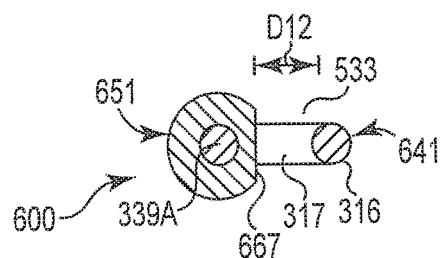
FIG. 14 is a copy of the sectional view taken along lines 13-13 of FIG. 12, except depicting a modified cross-sectional shape of a molded head portion of a fishing hook assembly, according to an embodiment of the present disclosure.

FIG. 14 is a sectional view similar to FIG. 13 that schematically illustrates a fishing hook assembly 600 (according to an embodiment of the present disclosure) that is substantially similar to the fishing hook assembly 500 of FIGS. 12-13, except with jig head 651 including a flat face portion 667 facing portion 316 of tie rail 641. In addition, in the embodiment of FIG. 14, the distance (D12) between face 667 of jig head 651 and portion 316 of tie rail 641 is shorter than distance (D11) in the embodiment of FIGS. 12-13. This shorter distance results in a generally narrower line-pass-through area 533, as compared to line-pass-through area 433 in FIGS. 12-13. This arrangement produces a fishing hook assembly 600 having a low width profile to make the tie rail less conspicuous in at least one dimension, while maintaining the length and generally uniform width of line-pass-through area 533 to facilitate tying a line onto tie rail 641.

Figure 16:
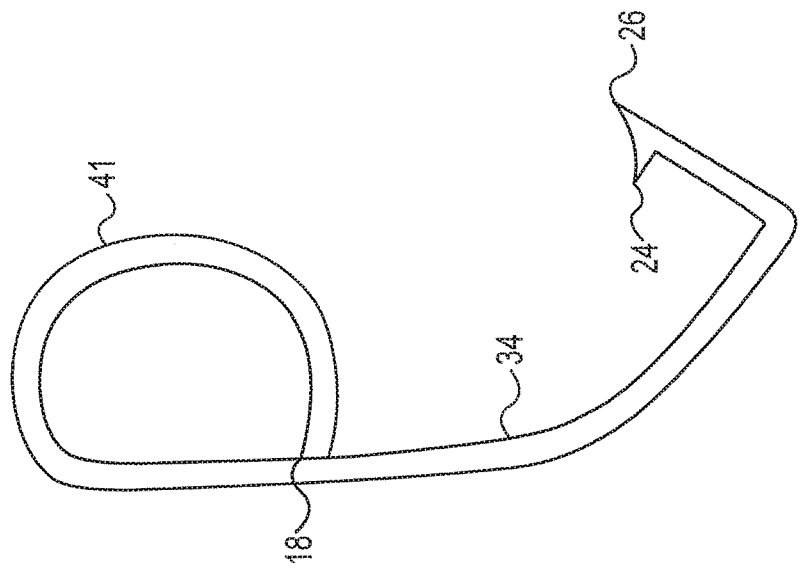
FIG. 16 is a side plan view schematically illustrating a fishing hook assembly, according to an embodiment of the present disclosure.
Figure 15:
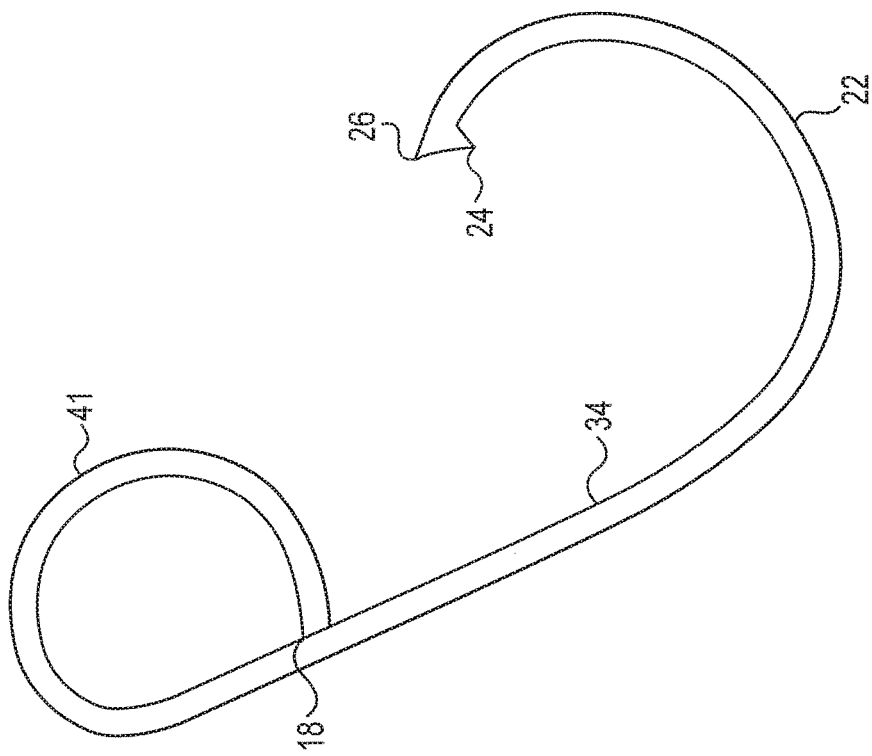
FIG. 15 is a side plan view schematically illustrating a fishing hook assembly, according to an embodiment of the present disclosure.

FIGS. 15-16 also schematically illustrate that any one of the fishing hook assemblies described in association with FIGS. 1-14 can employ different shaped curved portions that support barbed end 26.

A fishing hook assembly, according to embodiments of the present disclosure, is adapted for use in fishing for a large variety of fish and may be used with a large variety of baits in association with a large variety of fishing hook sizes. By way of example, the lure of the present disclosure could be sized for use with fishing hooks as small as 3/0 up to a 6 size fishing hook. Larger or smaller fishing hooks could of course be employed with corresponding changes in size for the head and other components of the fishing hook. A wide variety of baits could be used from shrimp, mullet strips or the like as well as other types of baits, natural or synthetic. Lastly, embodiments of the present disclosure are adapted to be used for fishing for a large variety of fish from casting, including jigging, whether done at the top surface of the water or any distance beneath the water surface.

It will be appreciated that the panoramic tie rail is particularly suited to tying various diameters of fishing line with ease, enabling tying lines in a manner that is more consistent and considerably easier to use versus conventional eyelets. Beginners and elderly will be elated with the ease and versatility.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein.

The invention claimed is:

1. A fishing hook assembly comprising:
   a jig head having a length and having a distal end;
   a hook element being of unitary construction and defined by a shaft, the shaft including a head portion and a tail portion, the tail portion including a generally straight shank portion and a curved portion extending proximally from the generally straight shank portion of the tail portion of the shaft and having a free end that includes a barb, the head portion having a generally straight portion extending distally in an opposite direction away from the tail portion, the head portion further comprising a tie rail portion extending beyond the distal end of the jig head and externally to and spaced from a side of the jig head;
   wherein a line-pass-through area is defined by an interior area extending between the tie rail portion and an outer surface of the side of the jig head opposite to and facing the tie rail portion;
   wherein the tie rail portion includes a first end where the tie rail portion extends distally from both the distal end of the jig head and the generally straight portion of the head portion in the opposite direction away from the tail portion and a second end where the tie rail portion extends outwardly from the outer surface of the side of the jig head at a location that is spaced from the first end of the tie rail portion and from the distal end of the jig head more than a distance between the tie rail portion and the outer surface of the side of the jig head;
   wherein the head portion of the shaft is connected to at least a portion of the jig head; and wherein the line-pass-through area defines a first cross-sectional area which is substantially larger than a cross-sectional area of the shaft.

2. The fishing hook assembly of claim 1, wherein the first cross-sectional area is about 3 to about 10 times larger than the cross-sectional area of the shaft.

3. The fishing hook assembly of claim 1, wherein the distance between the tie rail portion and the outer surface of the side of the jig head, at multiple points spaced along the outer surface of the side of the jig head, is less than a distance between the first end of the tie rail portion and the second end of the tie rail portion and is at least about 2 times greater than a diameter of the rail portion.

4. The fishing hook assembly of claim 1, wherein the tie rail portion includes a plurality of tie locations spaced apart from each other, along the tie rail portion.

5. The fishing hook assembly of claim 4, wherein the plurality of tie locations include at least:
   a first tie location proximate the first end of the tie rail portion;
   a second tie location at an intermediate portion of the tie rail portion spaced from the first end of the tie rail portion; and
   a third tie location proximate the second end of the tie rail portion, with the second tie location interposed between the respective first and third tie locations.

6. The fishing hook assembly of claim 1, wherein the jig head extends toward the free end of the tail portion beyond where the second end of the tie rail portion extends outwardly from the outer surface of the side of the jig head.

7. The fishing hook assembly of claim 1, wherein the generally straight portion of the head portion of the shaft includes an elongate straight portion, wherein the elongate straight portion extends distally from, and has a common longitudinal axis with, the generally straight shank portion of the tail portion.

8. The fishing hook assembly of claim 1, wherein at least a part of the head portion of the shaft is connected to the jig head by being embedded within the jig head.

9. The fishing hook assembly of claim 8, wherein the at least part of the head portion of the shaft that is embedded within the jig head includes at least a terminal end of the head portion of the shaft.

10. The fishing hook assembly of claim 8, wherein the at least part of the head portion of the shaft that is embedded within the jig head includes at least part of the generally straight portion of the head portion.

11. The fishing hook assembly of claim 10, wherein the at least part of the head portion of the shaft that is embedded within the jig head further includes at least a terminal end of the head portion of the shaft.

* * * * *